(12) United States Patent
Requet, III

(10) Patent No.: US 6,705,008 B1
(45) Date of Patent: Mar. 16, 2004

(54) SYSTEM AND METHOD FOR SLEEVING A LEAD WIRE

(75) Inventor: Charles Requet, III, Madison, IN (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 457 days.

(21) Appl. No.: 09/717,749

(22) Filed: Nov. 21, 2000

Related U.S. Application Data

(60) Provisional application No. 60/236,623, filed on Sep. 29, 2000.

(51) Int. Cl.[7] ............................................. H01R 43/00
(52) U.S. Cl. .......................... 29/872; 29/605; 29/596; 242/4; 242/703
(58) Field of Search .................... 29/605, 596, 872; 242/703, 4

(56) References Cited

U.S. PATENT DOCUMENTS

| | | | |
|---|---|---|---|
| 3,702,499 A | * | 11/1972 | Virsbreg |
| 4,602,424 A | * | 7/1986 | Kindig et al. |
| 5,361,487 A | * | 11/1994 | Luciani et al. |
| 5,556,045 A | * | 9/1996 | Johnson et al. |
| 5,756,149 A | * | 5/1998 | Smith |
| 5,839,678 A | * | 11/1998 | Huey et al. |
| 6,421,907 B1 | * | 7/2002 | De Hart |
| 6,439,497 B1 | * | 8/2002 | Backlund et al. |

* cited by examiner

Primary Examiner—Carl J. Arbes
(74) Attorney, Agent, or Firm—Amin & Turocy LLP; Alexander M. Gerasimow

(57) ABSTRACT

A system and method for sleeving a lead wire of a stator is provided. The stator includes a metal core and a plurality of lead wires extending from the metal core for providing electrical power and control signals to the stator. A gathering system is used to group the lead wires together. The lead wires are then separated and positioned by a separating system. Next, a single lead wire is secured with a grasping system and extended forward to an x, y, and z position in space. A sleeving system, fitted with an appropriately sized sleeve, is then guided along the lead wire so as to thread the sleeve with the lead wire. The stator or sleeving system is then rotated to sleeve another lead wire.

19 Claims, 16 Drawing Sheets

US 6,705,008 B1

SYSTEM AND METHOD FOR SLEEVING A LEAD WIRE

REFERENCE TO RELATED APPLICATION

This application claims the benefit of U.S. Provisional Patent Application Serial No. 60/236,623, which was filed Sep. 29, 2000, entitled SYSTEM AND METHOD FOR SLEEVING A LEAD WIRE.

TECHNICAL FIELD

The present invention generally relates to dynamoelectric machines. More particularly, the present invention relates to an automated system and method for providing placement of insulation on lead wires of a dynamoelectric machine during a manufacturing process.

BACKGROUND OF THE INVENTION

Induction motors typically include a stator and a rotor. The stator includes a hollow metallic core with a plurality of coils or windings running through the core. An alternating current is passed through these coils to generate an alternating magnetic flux field. The rotor includes a plurality of coils or windings in which an alternating current is induced by the alternating magnetic flux field of the stator. The end coils or end turns of the stator are grouped together at axial ends of the stator and are laced or stitched together to prevent interference with other components of a system. Also extending from axial ends of the stator are several groups of bare wire leads. The end turns may be coated with an epoxy or resin subsequent to stitching. This coating helps to reduce movement of the bare wires and provides an insulated barrier between the wires and other objects. Lacing in this case helps assure that the coils are tightly grouped together prior to coating.

Leads serve to supply electrical power and control signals to the stator during operation. The leads are typically insulated from one another with a non-electrically conductive shield or s sleeve, respectively, because each of the leads carry signals of varying electric potential. The non-electrically conductive sleeve provides the leads with protection from shorting in the event that two or more leads happen to cross. During manufacture of the stator, placement of the sleeves on each lead is done manually by an operator on the manufacturing floor. More particularly, the operator initially retrieves pre-cut sleeves and then manually threads each lead through its respective sleeve thereby providing the needed insulation. Manual sleeving of each lead wire is tedious, time consuming, and involves ongoing operator involvement during the stator manufacturing cycle.

Therefore, there is an unmet need in the art for a system and method for sleeving a lead wire which minimizes the amount of manual intervention needed so as to overcome the aforementioned deficiencies.

SUMMARY OF THE INVENTION

The present invention provides for a system and method for automating the sleeving process of lead wires. A stator of a dynamoelectric machine includes a hollow metal core with conducting wires orientated axially through the core. The conducting wires are grouped together into end windings which converge at upper and lower ends of the metal core. A series of lead wires extend from the upper end of the metal core and provide the stator with electric control and power signals. To electrically isolate the lead wires from one another, a sleeve is inserted over each lead wire. During the sleeving process, the lead wires are positioned to provide for grasping, and are insulated with sleeves. The present invention provides for an automated system to accomplish this process.

According to one aspect of the present invention, a system for sleeving the end lead wires includes using a gathering system to group the lead wires together. After the lead wires are sufficiently gathered together, a separating system is used to position the lead wires into predetermined locations. Alternatively, the separating system may only be used to space apart the lead wires and a sensory mechanism, such as a vision system, may be used to locate the position of the lead wires. Next, a grasping system will locate and secure a single lead wire between its finger clamps. The lead wire is then pulled away from group of lead wires and extended to a predetermined x, y, and z position in space.

A sleeving system is then used to insulate the lead wires. The sleeving system is fitted with an insulating sleeve positioned in a guiding channel. The sleeving system also includes a motor which operates to rotate a pair of internal rollers. The rollers, in turn, are operable to guide the sleeving system along the extended lead wire, thereby, pulling the lead wire through the guiding channel and through the sleeve. The sleeving system, then, separates along the centerline of the guiding channel and allows the sleeve to slide down the length of the lead wire. The lead wire is sufficiently insulated and the stator or the sleeving system may be rotated to repeat the sleeving process.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1A:
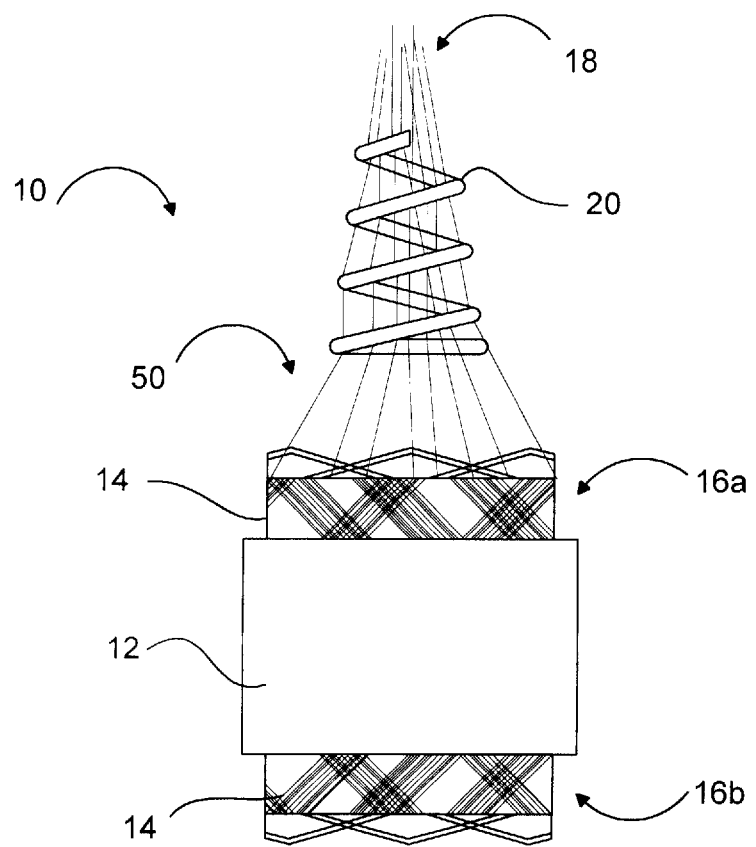
FIG. 1a is a front view illustrating a gathering and separating system in accordance with one aspect of the present invention.
Figure 1A:
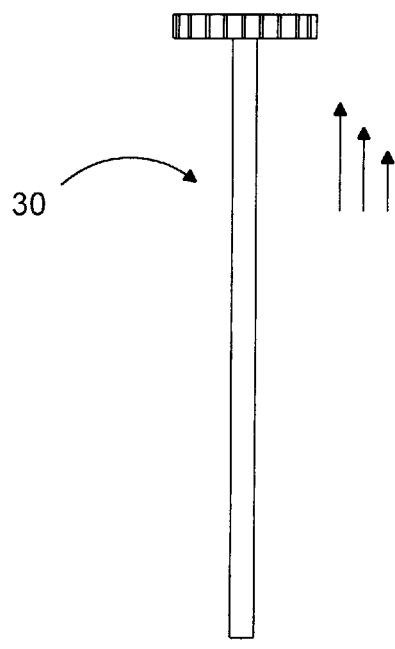

The present invention will now be described with reference to the drawings in which like reference numerals are used to refer to like elements throughout. The present invention will be described with reference with a system for sleeving bare lead wires extending from a portion of a dynamoelectric machine (e.g., a stator). The present invention will also be described with reference to a methodology for employing the system.

FIG. 1a illustrates an example of how a stator 10 for an electric motor (not shown) may be situated during the initial steps of a sleeving process in accordance with the present invention. The stator 10 includes a hollow metal core 12, for example, formed from stacked laminations with conducting wires 50 oriented axially through the core 12. The conducting wires are grouped together into end coils or end windings 14 which converge into a generally toroid shaped configuration at the upper and lower ends 16a, 16b, respectively, of the metal core 12. Lead wires 18 extend from the end windings 14 situated on the upper end 16a of the metal core 12 and are used to provide the stator 10 with electrical control and power signals as is known in the art. For example, the lead wires 18 may provide the stator 10 with three phase power, thermal relay signals, etc. It will be appreciated that the stator 10 may include any number of sets of leads 18 depending on the operational requirements of the stator 10.

Figure 1B:
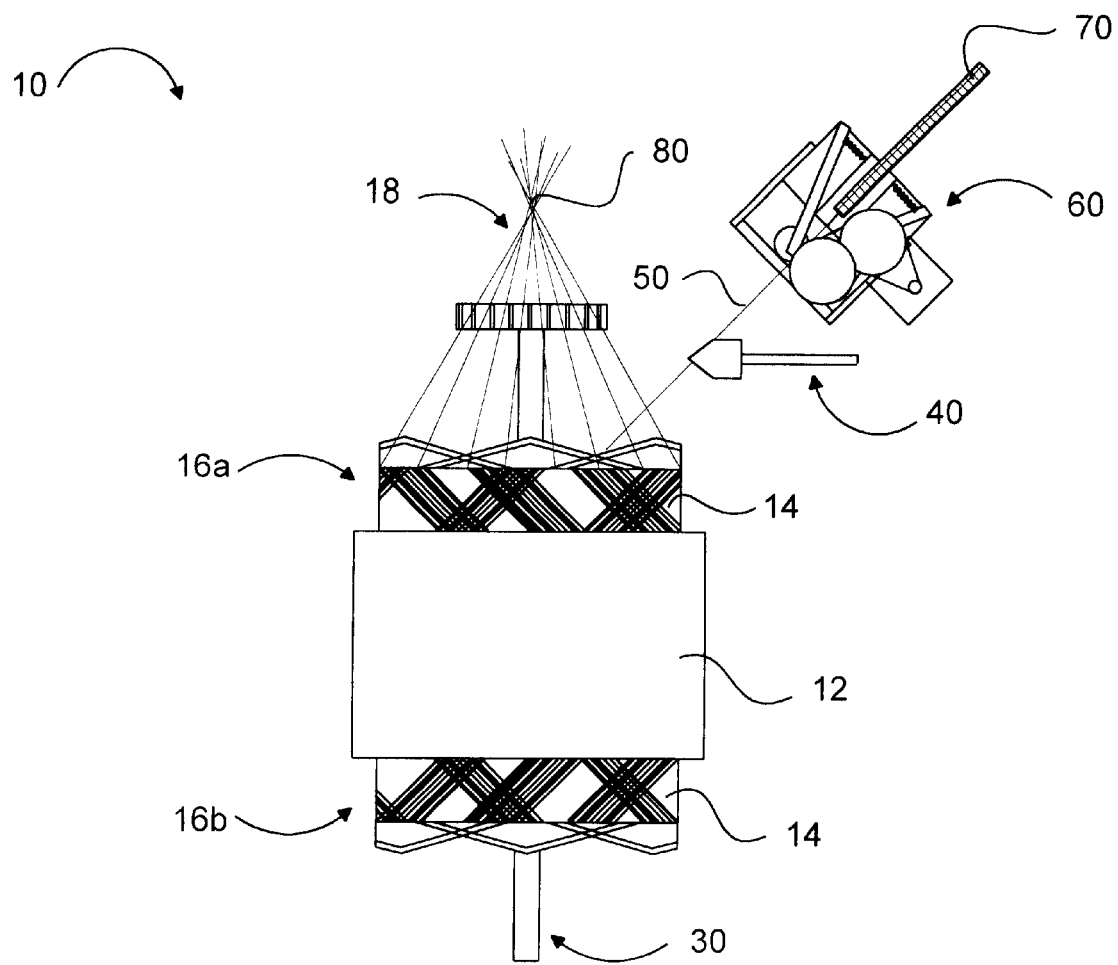
FIG. 1b is a front view illustrating a system for sleeving a plurality of lead wires of a stator in accordance with one aspect of the present invention.

During the sleeving process, the lead wires 18 are grouped together with a gathering system 20 to aid in the positioning of the lead wires 18. A separating system 30 is then inserted through the center of the stator core 12 and employed to separate the lead. wires 18 into predetermined positions, as shown in FIG. 1b. Arranging the lead wires 18 into such predetermined positions assists a grasping system 40 in singling out an individual lead wire 50 and extending the lead wire 50 outwards. The grasping system 40 is also employed to introduce the lead wire 50 to a sleeving system 60. As will be discussed in more detail below, the sleeving system 60 applies an insulated tube, or sleeve 70, to the extended lead wire 50, thereby insulating the lead wire. The stator 10 may then be rotated to repeat the sleeving process for another lead wire. It will be appreciated, that while the present invention describes the steps of the sleeving process in sequential fashion, it is possible for the stator 10 to be introduced to other steps both before and after any of the steps referred to herein and the present invention is not limited to an example in which all of these steps are performed back to back.

Figure 2:
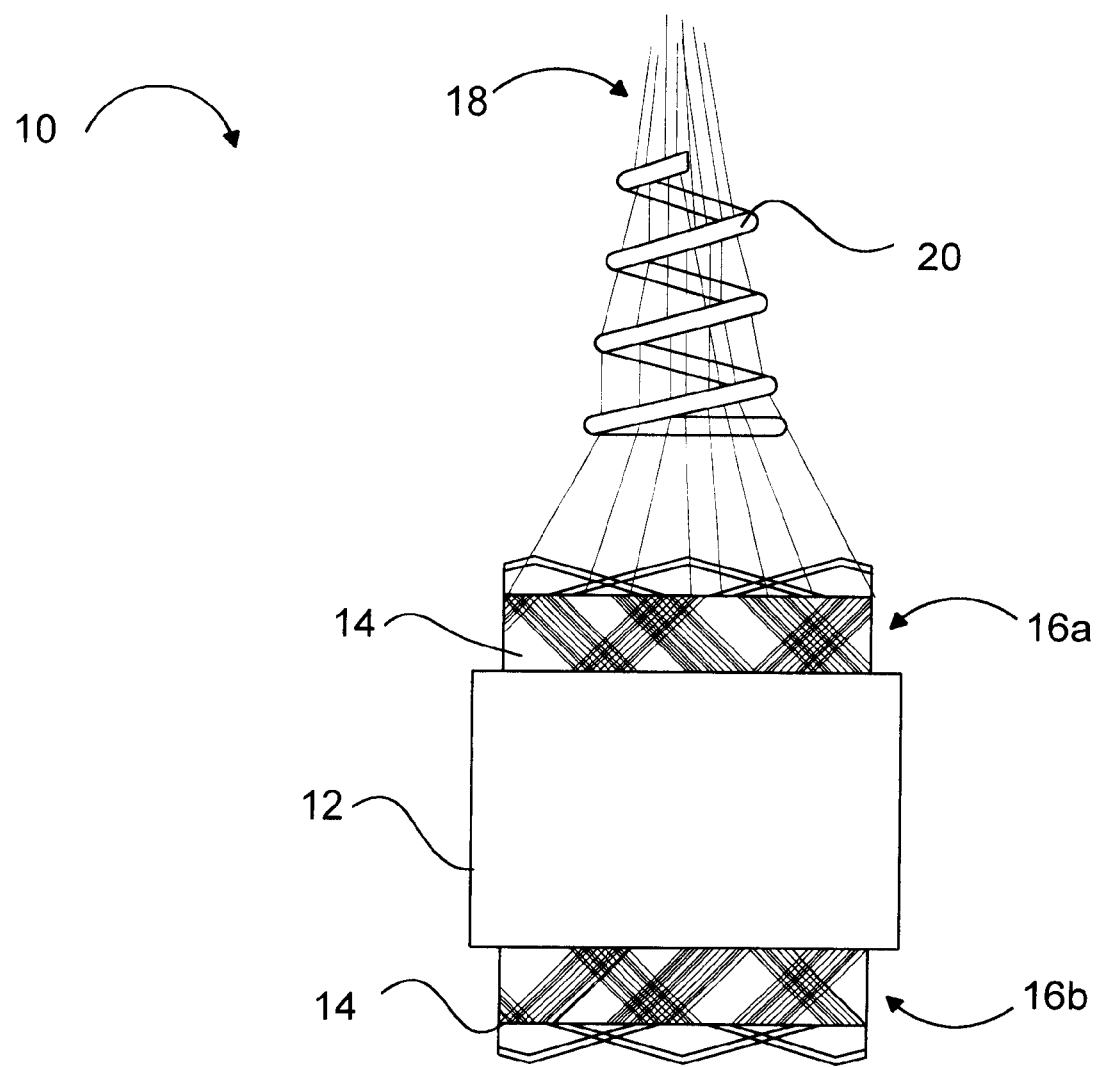
FIG. 2 is a front view of a gathering system grouping lead wires of a stator together in accordance with one aspect of the present invention.

Referring now to FIG. 2, the gathering system 20, utilized to group together the lead wires 18 of a stator 10, is depicted. The gathering system 20 may be helical shaped and of sufficient strength to pull the lead wires 18 inward and upward until the ends of the lead wires 18 meet at a single point 80 as illustrated in FIG. 1b. The material of the gathering system 20 may also be flexible enough to accommodate both the diameter of the upper end windings 16a and the diameter at the point 80 where the lead wires meet. The operation of the gathering system 20 may further be automated. An example of an automated operation may include an extended arm, coupled with the gathering system 20, and a robot to rotate said extended arm until the lead wires 18 are sufficiently grouped together. Alternatively, however, any gathering system or method utilized to group the lead wires 18 together may be used and is contemplated as falling within the scope of the present invention.

Figures 3A, 3B:
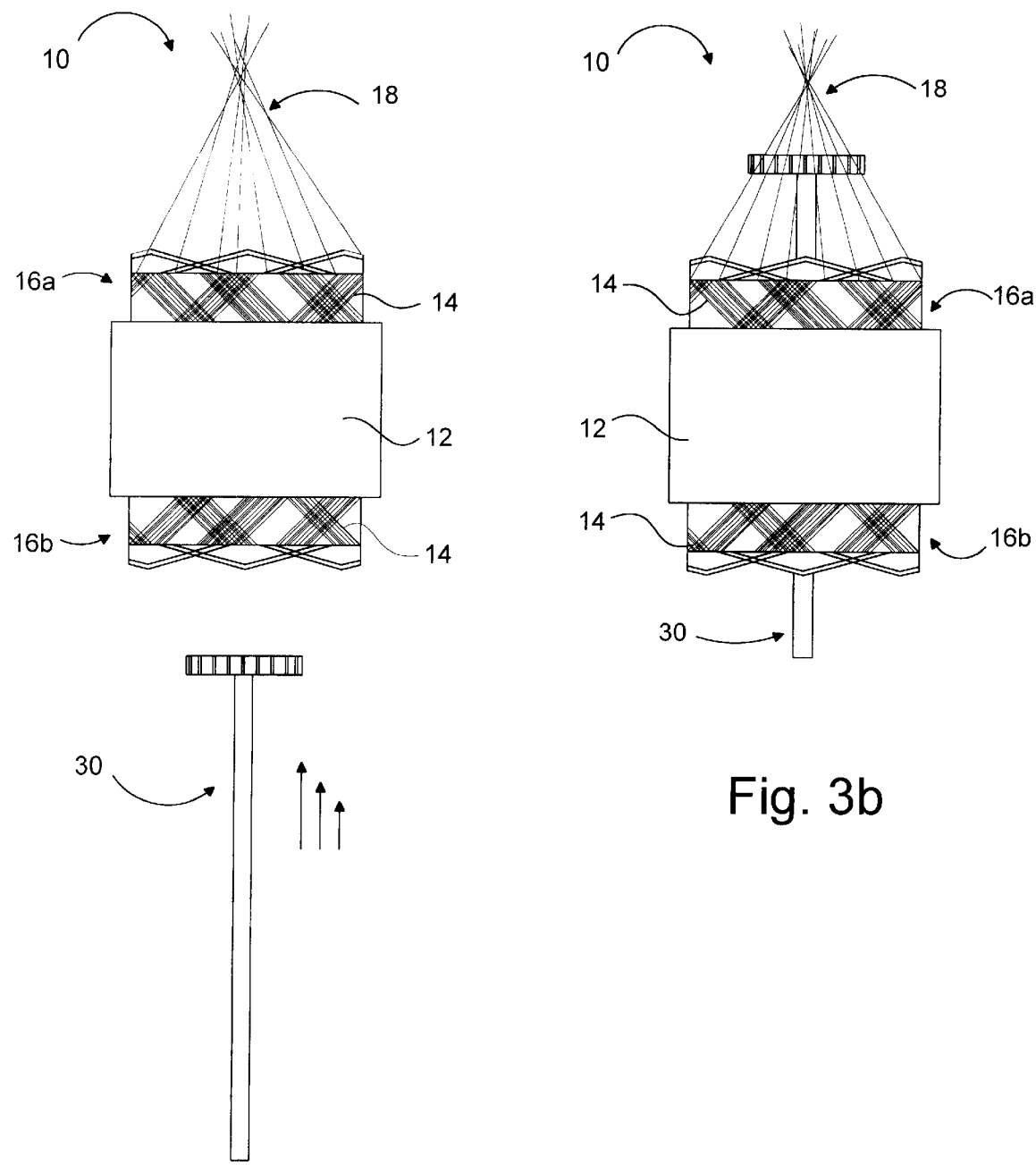
FIG. 3a is a front view of the stator and a separating system in accordance with one aspect of the present invention.
FIG. 3b is a front view of the stator coupled with the separating system in accordance with one aspect of the present invention.

FIGS. 3a and 3b illustrate one possible manner of separating the lead wires 18 into predetermined positions. As mentioned above, the separating system 30 is inserted upward through a hollow portion of the stator core 12 until the separating system 30 sufficiently interacts with the lead wires 18. The interaction is sufficient when the lead wires 18 fall into a predetermined position on the separating system 30. An example of such an interaction is shown in FIG. 3b. The separating system 30 may be manually operated or automated. An example of an automated operation is similar to the automated gathering operation described above. An extended arm, coupled with the separating system 30, may be operated by a robot to separate the lead wires 18 into predetermined positions.

Figures 4A, 4B:
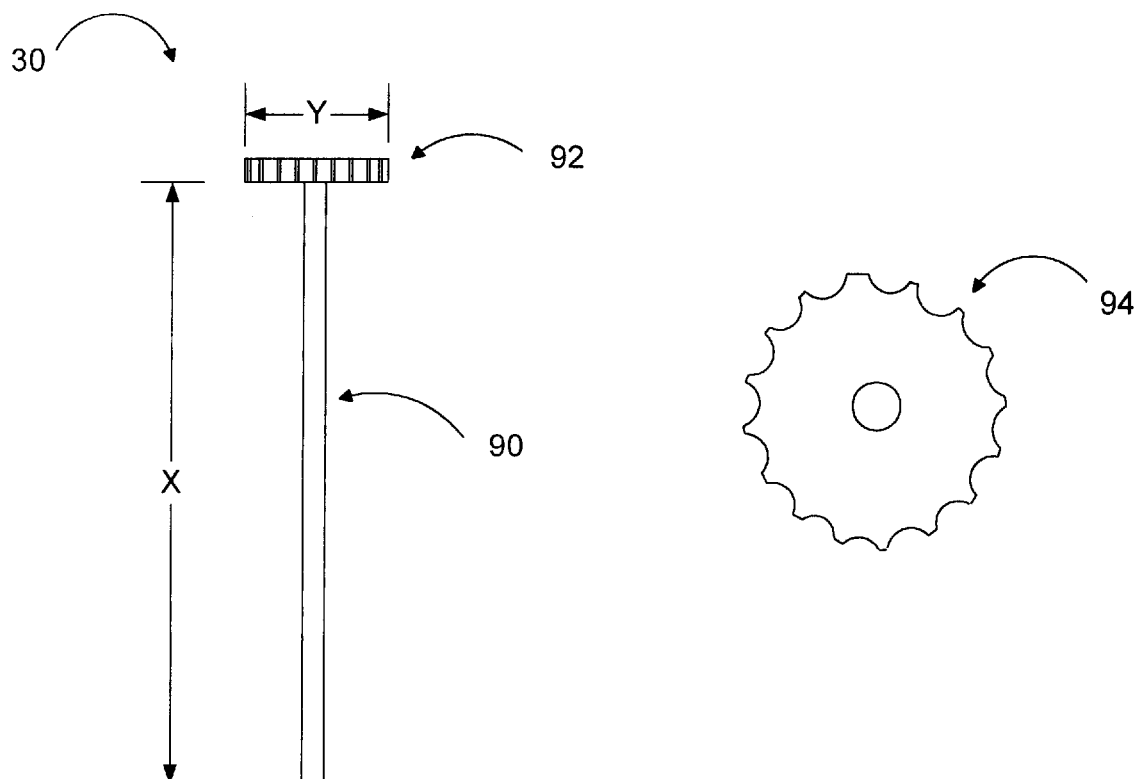
FIG. 4a is a front view of the separating system in accordance with one aspect of the present invention.
FIG. 4b is a top view of the separating system for FIG. 4a in accordance with one aspect of the present invention.

Referring now to FIGS. 4a and 4b, one example of the separating system 30 is illustrated in further detail. FIG. 4a illustrates that the separating system 30 is comprised of two primary components: an arm 90 and a head 92. The arm 90 may be of a length X so that it will extend below the stator 10 when the head 92 of the separating system is fully engaged with the lead wires 18, as illustrated in FIG. 3b. A diameter Y of the head 92 should be smaller than the diameter of the hollow portion of the stator core 12, so as to allow the separating system 30 to pass through the core 12, and yet, large enough to adequately position the lead wires 18 in a predetermined location. The head 92 may further comprise a pattern of notches, or teeth, 94 in which the lead wires are positioned. Alternatively, however, the system may include a sensory mechanism, such as a vision system, to locate the position of the lead wires 18. Therefore, any system or method utilized to position the lead wires 18 may be used and is contemplated as falling within the scope of the present invention.

Figure 5:
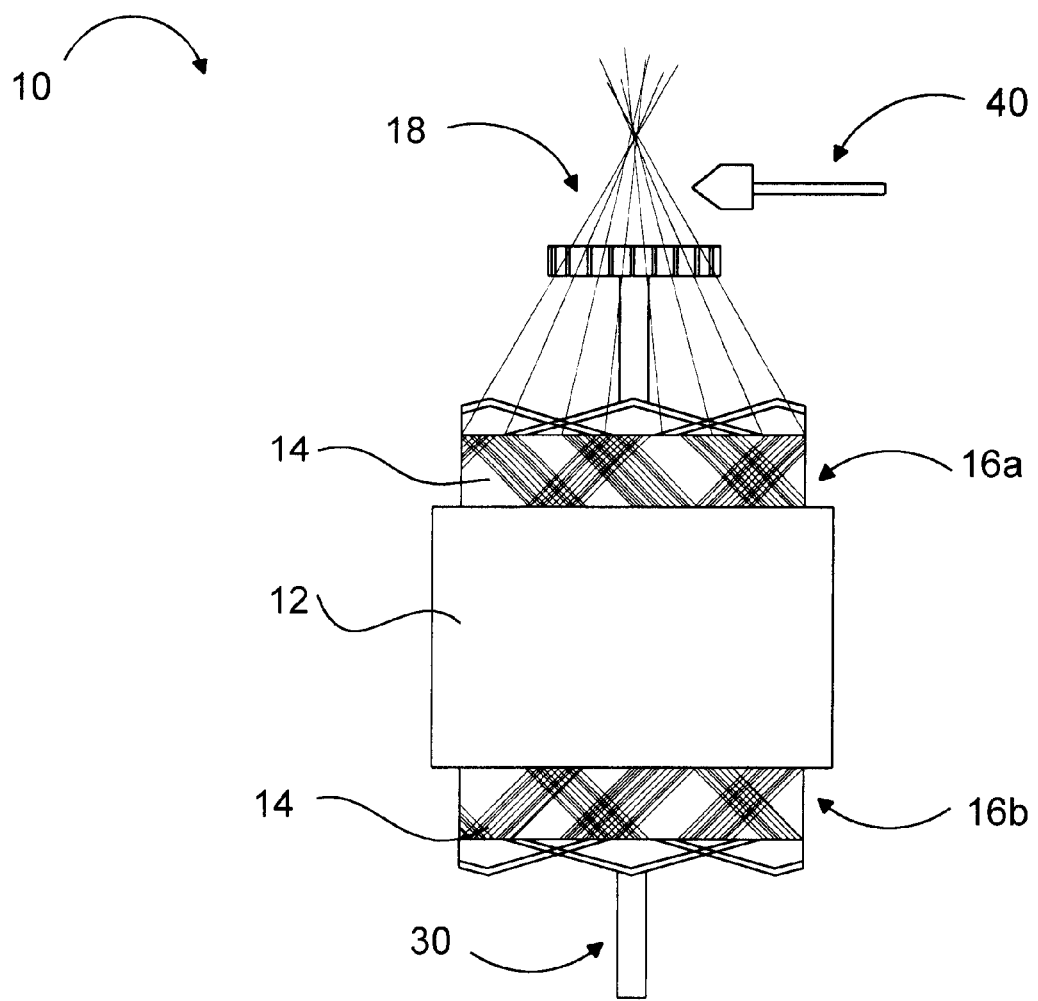
FIG. 5 is a front view of the stator coupled with the separating system and a grasping system in accordance with one aspect of the present invention.

Next, as shown with respect to FIG. 5, the grasping system 40 is employed to single out a lead wire 18. During the grasping process, the lead wires 18 remain grouped together and positioned with the separating system 30. The grasping system 40 may then move towards the stator 10 in a substantially horizontal direction to grasp a lead wire 18. Once the lead wire 18 has been secured, the grasping system 40 may then retract in a similar horizontal direction so as to extend the lead wire 18 outward from the stator 10. Further, a robot may be coupled with the grasping system 40 so as to automate the grasping process.

Figure 6:
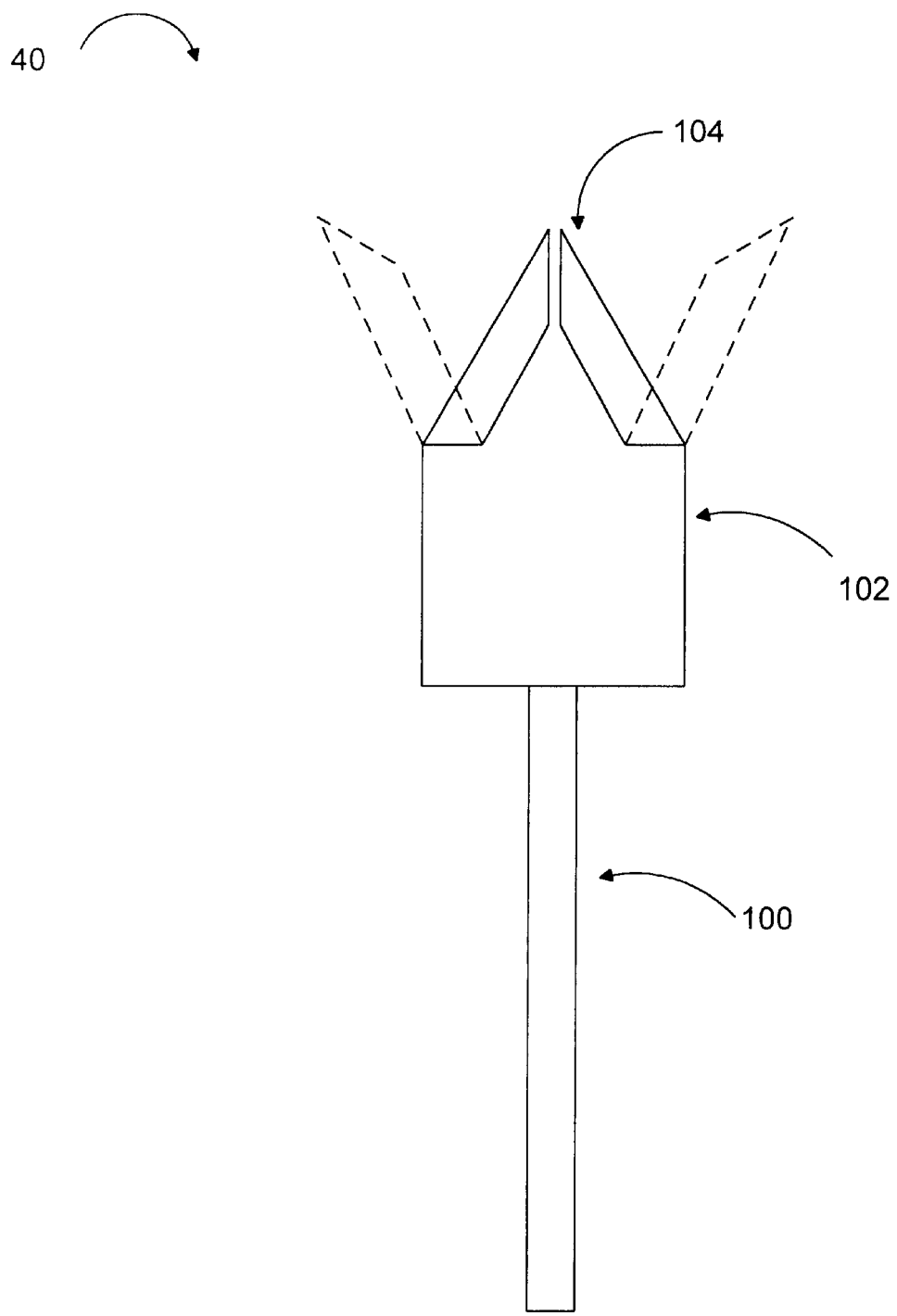
FIG. 6 is a top view of the grasping system in accordance with one aspect of the present invention.

The grasping system 40 mentioned above is shown in greater detail in FIG. 6. The system may comprise an arm 100 and a head 102. The head 102 may further comprise at least, but not limited to, two finger clamps 104 which may be positioned by a control module to lift and secure an intended object, such as a lead wire, therebetween. The grasping system 40 may further comprise a sensory mechanism to locate the position of the lead wires 18. Therefore, any system or method utilized to grasp a lead wire 18 may be used and is contemplated as falling within the scope of the present invention.

Figure 7A:
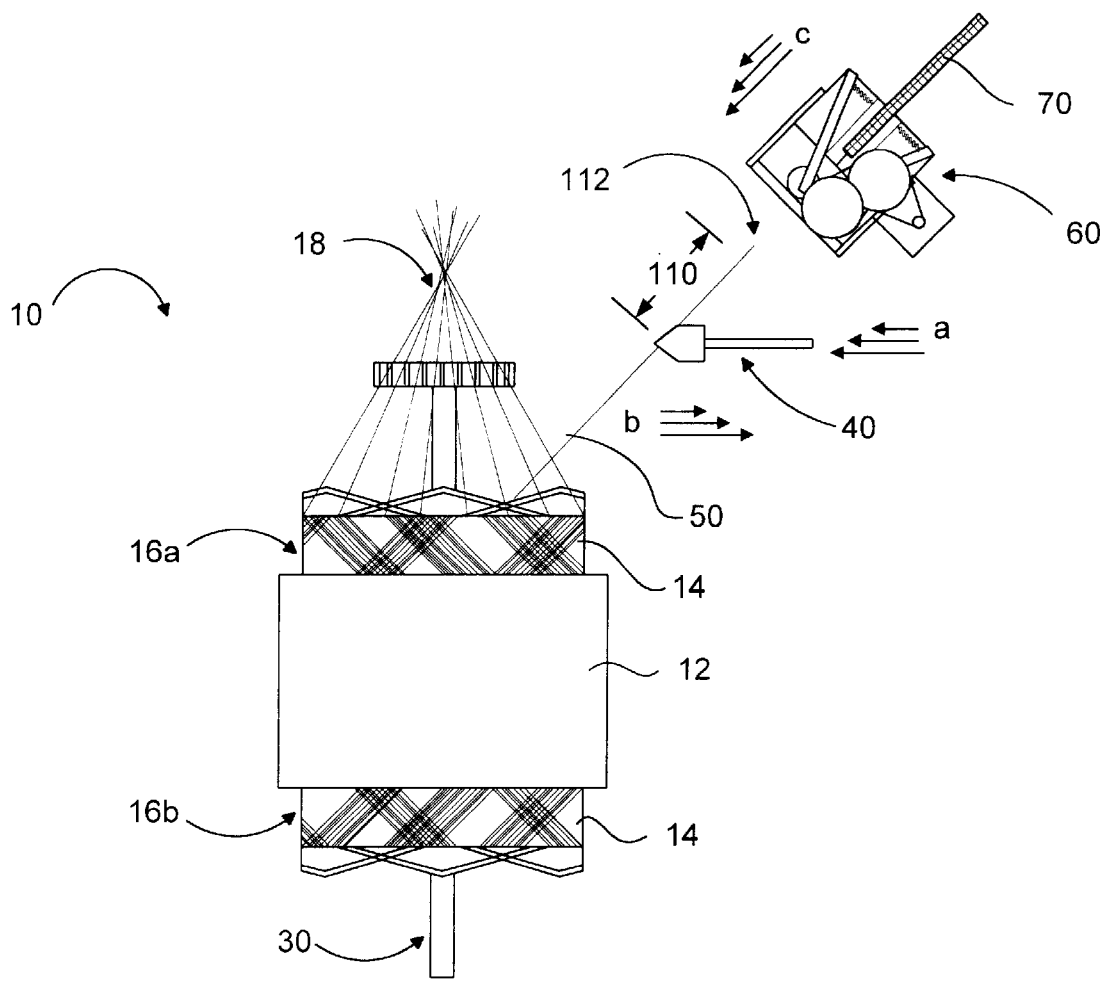
FIG. 7a is a front view of the stator with a sleeving system in preparation of applying a sleeve to a lead wire in accordance with one aspect of the present invention.

In FIGS. 7a through 7e, a method of sleeving a lead wire will be described. Referring to FIG. 7a, the grasping system 40 may extend along a substantially horizontal plane, in the direction of arrows "a", toward the stator 10 so as to capture and secure a top portion 110 of a lead wire 50. The grasping system 40 may then retract along a similar horizontal plane, in the direction of arrows "b", until the lead wire 50 is positioned to a predetermined x, y, and z position in space.

During the time in which the grasping system 40 properly secures and positions the lead wire 50, a second grasping system (not shown) is introduced to the system to obtain an appropriately sized sleeve 70 for placement on the lead wire 50. The appropriately sized sleeve 70 in then placed into a counterbore of a slightly larger diameter than the sleeve 70, which is located in a top portion of the sleeving system 60. The counterbore is utilized to allow each sleeve that is inserted into the sleeving system 60 to be positioned at substantially the same depth. Once the lead wire 50 is in it's predetermined x, y, and z position and the sleeving system 60 is prepped with the sleeve 70, the sleeving system 60 moves along a plane, in the direction of arrows "c", to meet with the tip 112 of the lead wire 50. The sleeving system 60 may also include a sensory mechanism to allow for positioning with respect to the tip 112 of the lead wire.

Figure 7B:
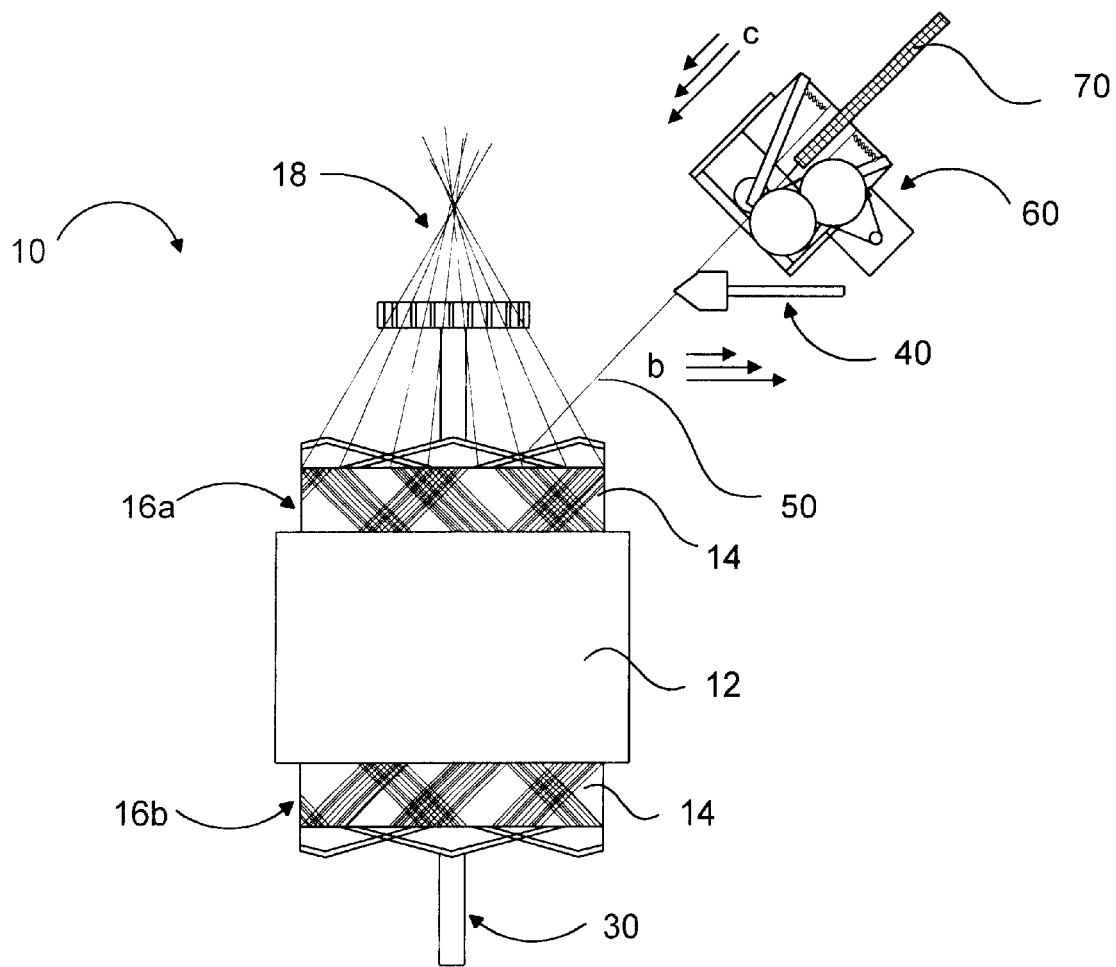
FIG. 7b is a front view of the stator with the sleeving system threading the lead wire through the sleeve in accordance with one aspect of the present invention.

FIG. 7b illustrates the sleeving system 60 engaged with the lead wire 50. The lead wire 50 enters through an aperture at the bottom of the sleeving system 60. Rollers, operated by way of a motor and gear assembly, may then be employed to guide sleeving system 60 along the lead wire 50 in the direction of arrows "c" as the lead wire 50 is threaded up through the center of the sleeving system 60 into the sleeve 70. Once the sleeving system 60 has moved a predetermined distance along the lead wire 50, the finger clamps 104 of grasping system 40 open to release the lead wire 50. The grasping system 40 then retracts along a substantially horizontal plane in the direction of arrows "b".

Figure 7C:
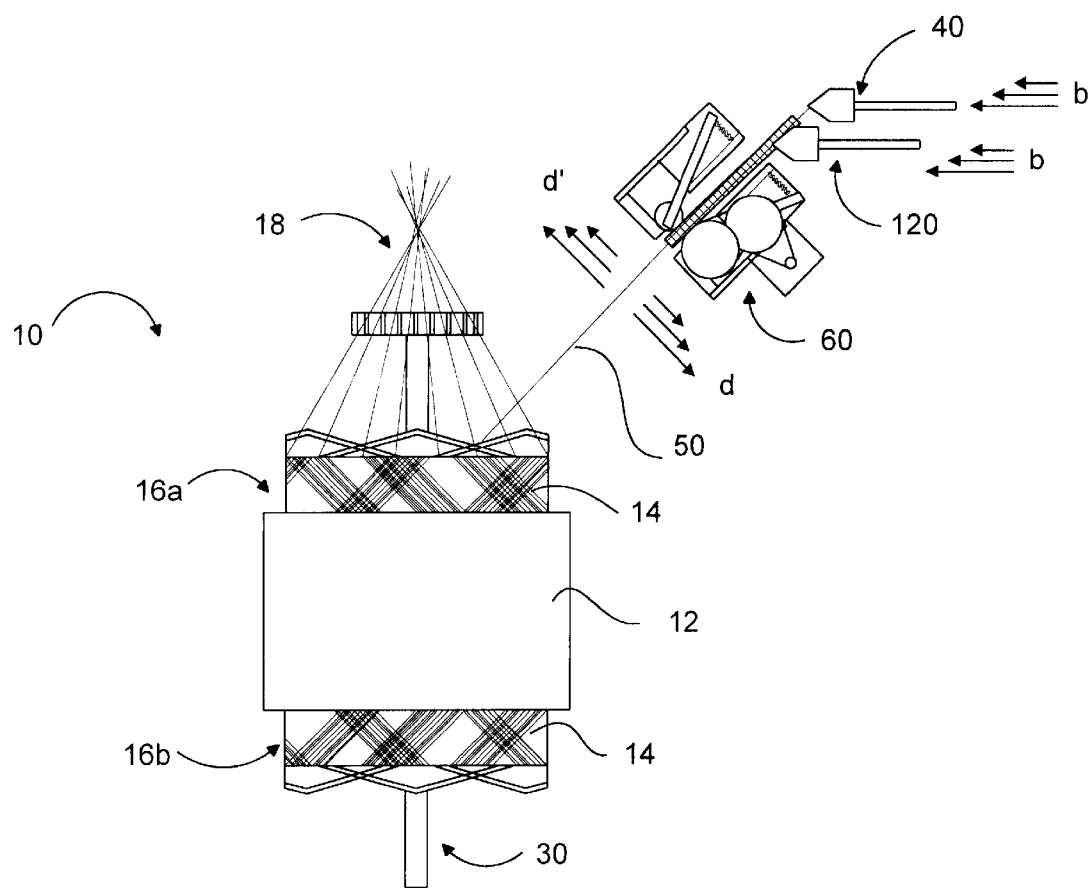
FIG. 7c is a front view of the stator with the sleeving system separating in accordance with one aspect of the present invention.

Referring to FIG. 7c, after the lead wire 50 has extended through the sleeve 70, the grasping system 40 returns along a substantially horizontal plane, in the direction of "b", to secure the tip 112 of the lead wire within the finger clamps 104. A second grasping system 120 is then introduced to the system by traveling along a similarly horizontal plane, in the direction of "b", to locate and secure the sleeve 70. Once both the tip 112 of the lead wire 50 and the sleeve 70 have been secured, the sleeving system 60 separates along a centerline, as depicted by the arrows "d" and "d", to free itself from the lead wire 50 and sleeve 70 combination.

Figure 7D:
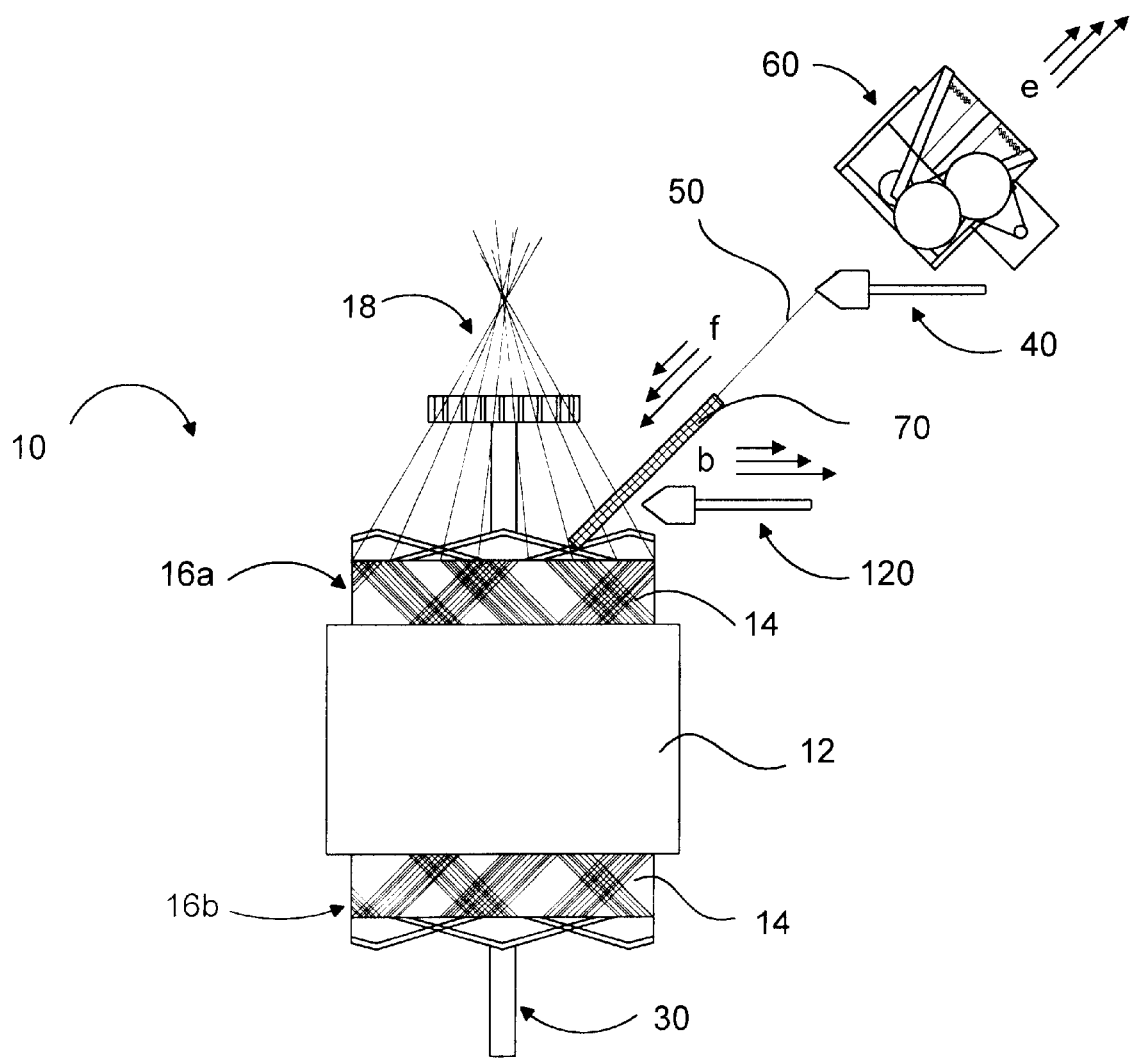
FIG. 7d is a front view of the stator with the grasping system guiding the sleeve along the lead wire in accordance with one aspect of the present invention.

Turning now to FIG. 7d, the sleeving system 60 retracts away from the lead wire 50 and sleeve 70 combination in the direction of arrows "e". The second grasping system 120, while still associated with the sleeve 70, guides the sleeve 70 along the lead wire 50 in the direction of arrows "f" until the sleeve 70 is positioned at the base of the lead wire 50. The grasping system 40 may then release the sleeve 70 and retract back along a substantially horizontal plane, in the direction of arrows "b".

Figure 7E:
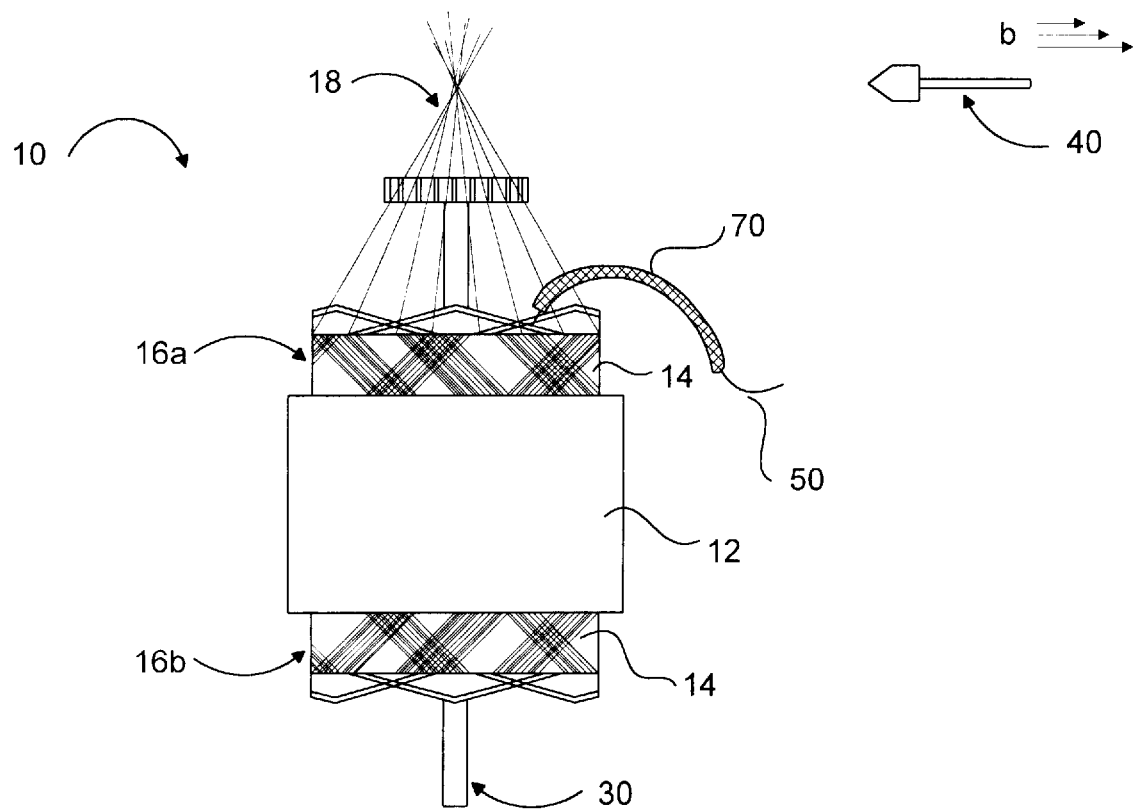
FIG. 7e is a front view of the stator with one lead wire sleeved and the grasping system moving away from the stator in accordance with one aspect of the present invention.

Finally, in FIG. 7e, the initial grasping system 40 releases the tip 112 of the lead wire 50 to retract in the direction of "b". The lead wire 50 is now considered insulated, or sleeved. The stator 10 or the sleeving system may now rotate and select another lead wire to repeat the aforementioned sleeving process.

Figure 8A:
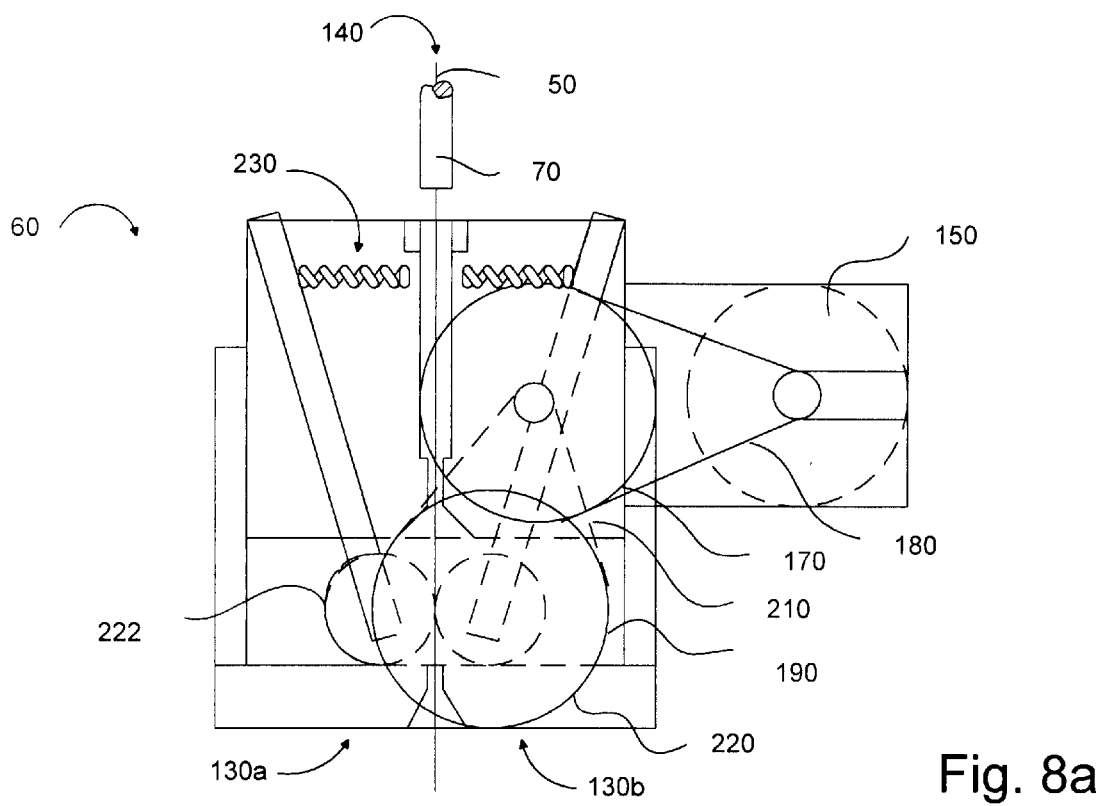
FIG. 8a is a front view of a sleeving system in accordance with one aspect of the present invention.
Figure 8B:
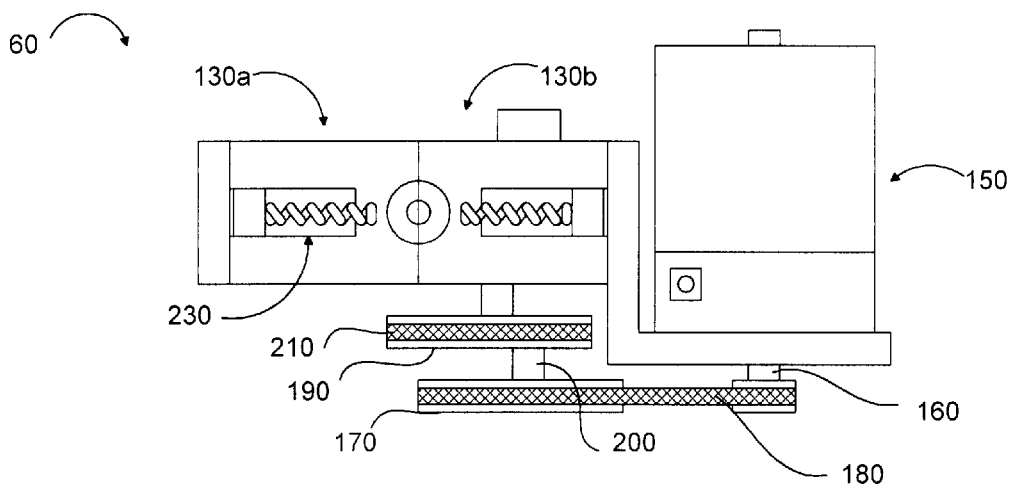
FIG. 8b is a top view of the sleeving system in accordance with one aspect of the present invention.
Figure 8C:
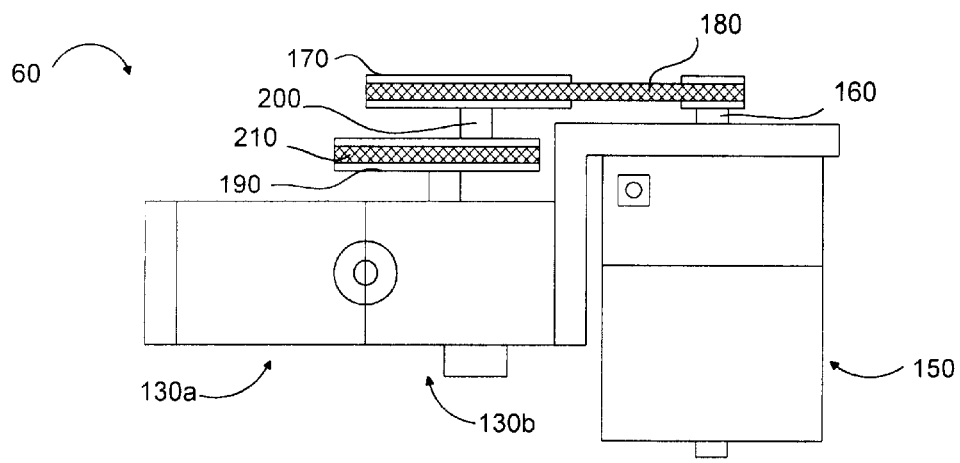
FIG. 8c is a bottom view of the sleeving system in accordance with one aspect of the present invention.

Referring now to FIGS. 8a through 8e, a more detailed description of the sleeving system 60 will be presented. FIG. 8a illustrates a front view of the sleeving system 60 which comprises two halves 130a, 130b separable at a centerline 140. The halves 130a, 130b may be connected by dowel pins or the like. In the present example, at least two dowel pins can be press fit into one half of the sleeving system. The other half is manufactured with mating holes of a similar diameter to allow a snug fit with the dowel pin and yet, permit the halves to easily detach and reattach. It will be appreciated that while the present example describes a dowel pin attachment, other fasteners or securing systems may alternatively be used.

The sleeving system 60 may further comprise a motor 150 to facilitate operation of the system. Further illustrated in FIGS. 8b and 8c, the motor 150 may be coupled with a shaft 160 which, in turn, rotates a first gear 170 by way of a connecting belt 180. The first gear 170 may then be utilized to rotate a second gear 190 by a similar shaft 200 and connecting belt 210 system. The second gear 190 operates to set in motion an internal roller 220. This internal roller 220 is held adjacent to a second internal roller 222 by a spring force 230. The two rollers 220, 222 operate, as described above, to guide the sleeving system 60 along a lead wire 50, thereby threading the lead wire 50 through the sleeve 70.

Figure 8D:
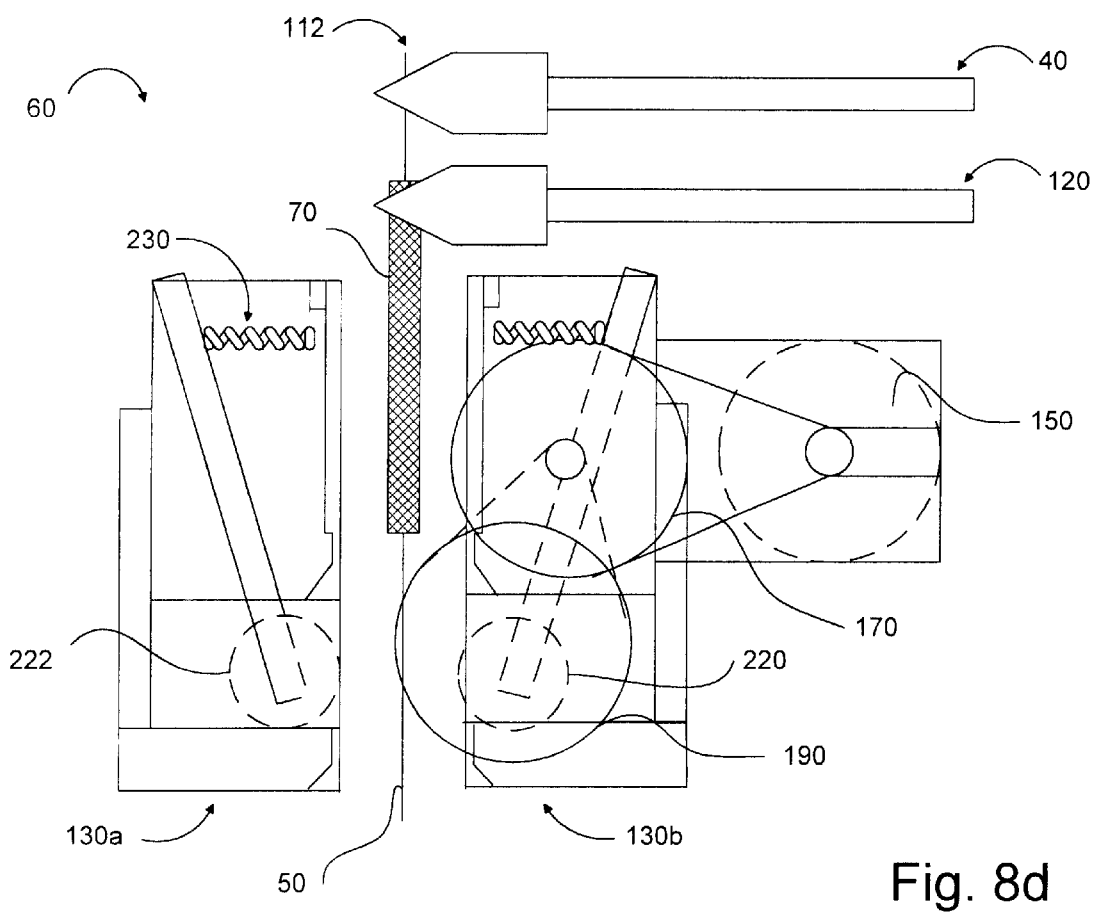
FIG. 8d is a front view of the sleeving system separated at the centerline in accordance with one aspect of the present invention.

FIG. 8d illustrates an example of one particular methodology for separation of the sleeving system 60. After the sleeving system 60 has moved far enough along the lead wire 50 so as to allow a portion of the lead wire 50 to extend beyond the sleeve 70, the grasping system 40 secures to the tip 112 of the lead wire 50. A second grasping system 120 then secures to a top portion 110 of the sleeve 70. Once these two components are held in position. The sleeving system 60 separates along the centerline 140 of a guiding channel 240 (FIG. 8e) and pulls away from the lead wire 50. At this time, the sleeve 70 may be guided the remainder of the way down the lead wire 50 as described with respect of FIGS. 7a–7e.

Figure 8E:
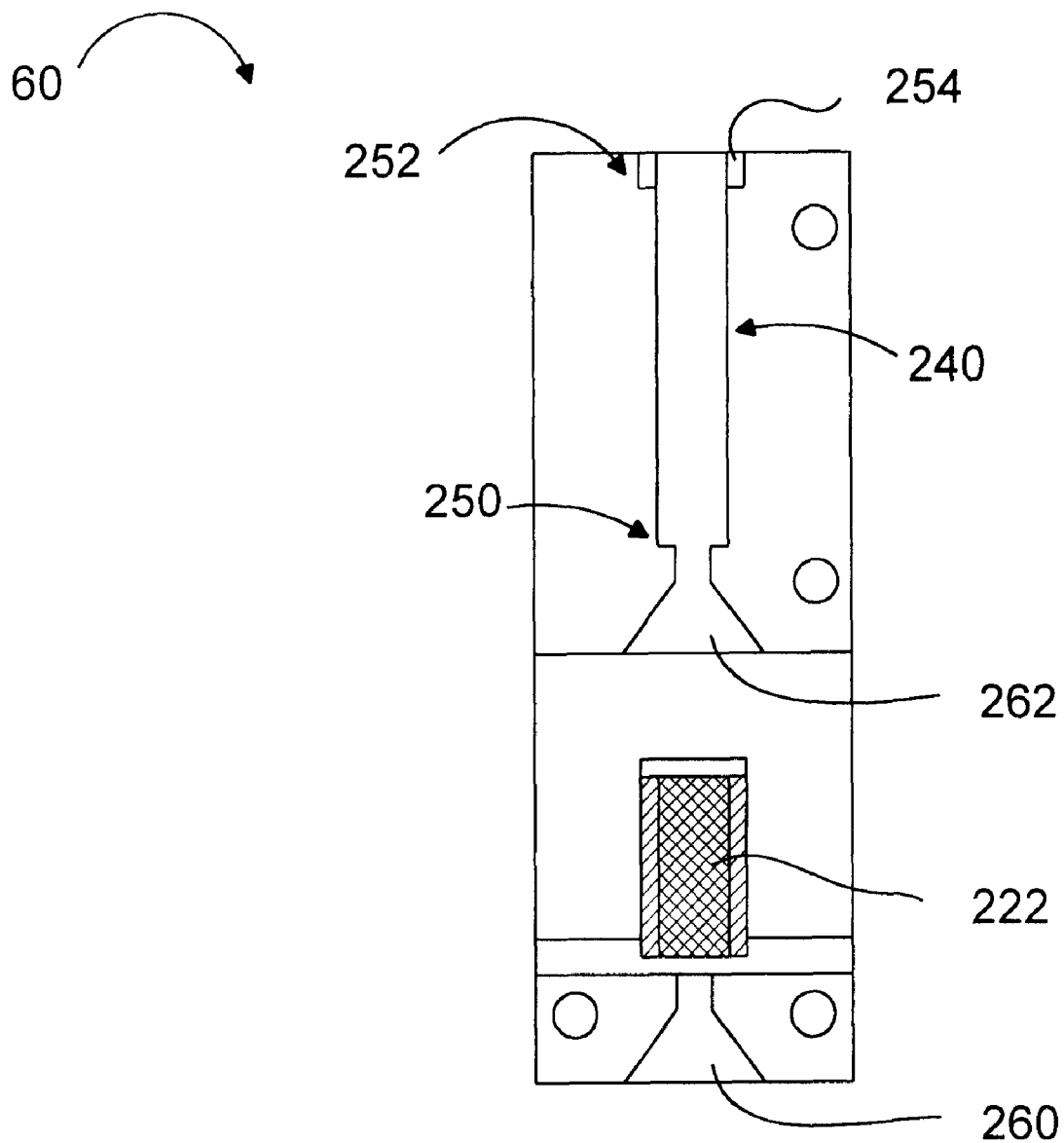
FIG. 8e is a cross sectional view of the sleeving system in accordance with one aspect of the present invention.

The sleeving system 60 includes the internal guiding channel 240 as shown in FIG. 8e. The channel 240 may include a counterbore 250 in the top portion of the sleeving system 60 adapted to secure a sleeve 70 in position. The channel 240 may further comprise an additional counterbore 252 in which an elastomer seat 254 may be inserted. The elastomer seat 254 may be employed to sufficiently grip the sleeve 70 and hold it in position to receive a lead wire 50. The bottom portion of the channel may be adapted to allow the lead wire 50 to pass up through the channel 240 into the sleeve 70. A bottom portion of the channel 240 may be further adapted to include a funnel-like opening 260. Such an opening 260 facilitates the threading of the sleeving system 60 onto the lead wire 50. A similar opening 262 may also be located at the start of the channel 240 located above the rollers 220, 222.

Figure 9:
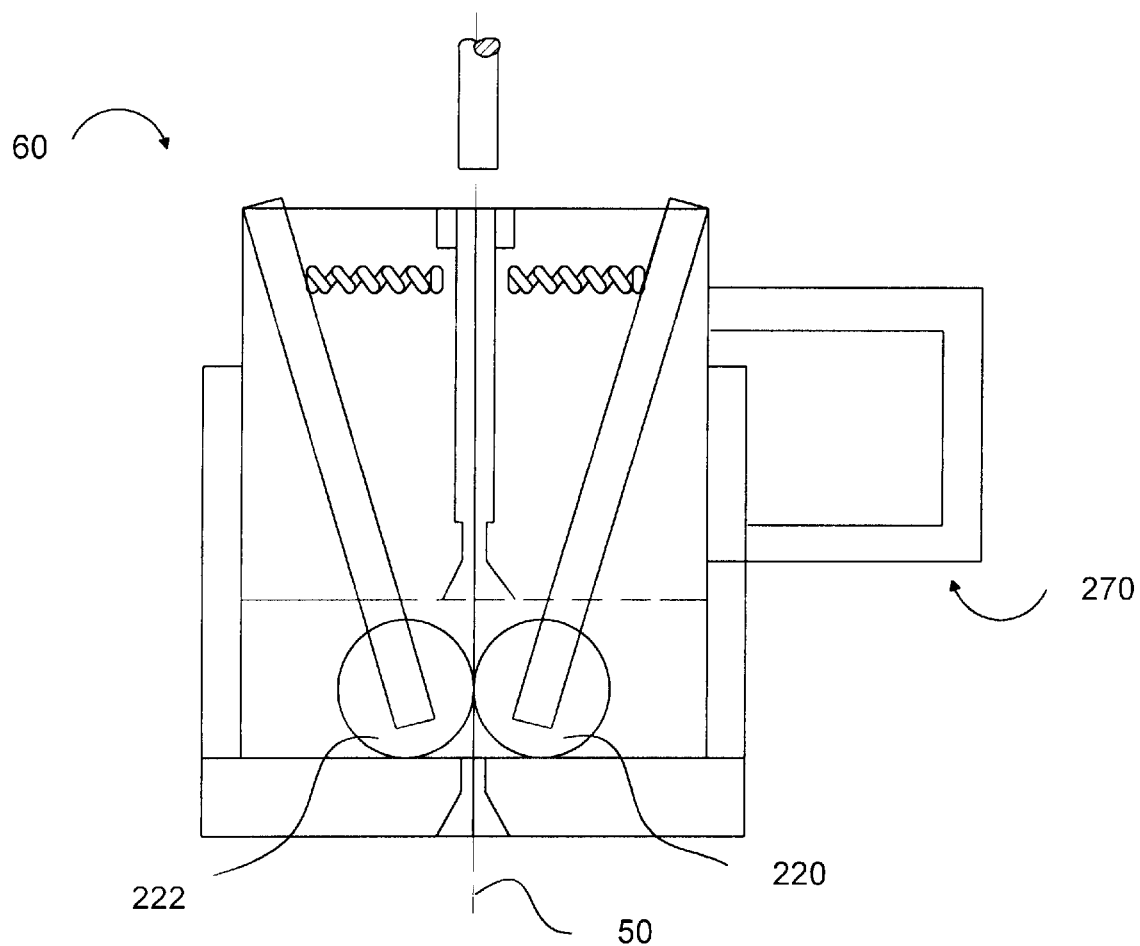
FIG. 9 is a front view of an alternative sleeving system in accordance with one aspect of the present invention.

Referring to FIG. 9, an alternative aspect of the present invention is depicted. Here, the external gears on the previously described embodiment are notably absent. The rollers 220, 222 are thus powered directly by a motor 270 to feed the lead wire 50 through the sleeving system 60. The remaining features in the alternative embodiment are similar to the features explained in FIGS. 8a through 8e and are not described further for the sake of brevity. Thus the present invention provides an automated sleeving system and method which increases the efficiency of the overall stator manufacturing cycle and allows operators additional capacity to perform other tasks.

Although the invention has been shown and described with respect to a certain preferred embodiment or embodiments, equivalent alterations and modifications will occur to others skilled in the art upon reading and understanding this specification and the annexed drawings. In particular regard to the various functions performed by the above described components (systems, assemblies, systems, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several embodiments, such feature may be combined with one or more other features of the other embodiments, as may be desired and advantageous for any given or particular application. Furthermore, to the extent that the term "includes" is used in either the detailed description or the claims, such term is intended to be inclusive in a manner similar to the term "comprising".

What is claimed is:

1. A system for sleeving leads of a stator, comprising:
   a guiding channel adapted to guide a lead wire into a sleeve residing in the guiding channel;
   at least one roller residing alongside the guiding channel, the at least one roller being operable to guide the sleeving system along the lead wire during threading of the lead wire into the sleeve; and
   a gathering system that gathers a plurality of lead wires to prepare the lead wires for sleeving.

2. The system of claim 1, further comprising a motor coupled to the at least one roller to control movement of the at least one roller.

3. The system of claim 2, the sleeving system further comprising at least one gear coupled between the motor and the at least one roller.

4. The system of claim 1, the gathering system having a generally helical shape that revolves around the lead wires to bring the lead wires together.

5. The system of claim 1, further comprising a first grasping system operable to grasp a single lead wire for sleeving from the plurality of gathered lead wires.

6. The system of claim 5, the first grasping system comprising an arm attached to at least two finger clamps, the at least two finger clamps being operable to secure the lead wire.

7. The system of claim 5, further comprising a second grasping system operable to grasp and guide the sleeve along the lead wire until the sleeve is positioned at the base of the lead wire.

8. The system of claim 7, the sleeving system being comprised of two halves separable at a centerline wherein separation of the two halves separates the sleeving system from the sleeve and lead wire combination during the sleeving process.

9. The system of claim 1, further comprising a separating system adapted to be inserted through a central opening of the stator to separate the lead wires into a predetermined position for sleeving.

10. The system of claim 9, wherein the separating system comprises a head portion coupled to an arm portion.

11. The system of claim 9, the head portion comprising teeth adapted to separate the lead wires.

12. The system of claim 1, wherein the sleeving system further comprises two halves, separable at a centerline.

13. The system of claim 1, wherein one end of the guiding channel is configured to accommodate the sleeve.

14. The system of claim 1, wherein one end of the guiding channel is configured to accommodate the lead wire.

15. The system of claim 1, wherein the at least one roller comprising two rollers which are held adjacent to each other with a spring force, the two roller being operable to guide the lead wire through the guiding channel.

16. A system for sleeving a lead wire of a stator, comprising:
   means for placing a sleeve over a lead wire;
   means for automatically threading the lead wire through the sleeve;
   means for separating the means for automatically threading from the lead wire and sleeve combination;
   means for gathering lead wires; and
   means for separating lead wires into predetermined position for sleeving.

17. The system of claim 16, further comprising means for inserting a sleeve into the means for automatically threading.

18. The system of claim 16, further comprising means for guiding the sleeve along the lead wire until the sleeve is positioned at the base of the lead wire.

19. The system of claim 16, further comprising means for grasping a single lead wire for sleeving from a plurality of gathered and separated lead wires for sleeving lead wires one at a time.

* * * * *